US012383093B2

(12) United States Patent
Bock et al.

(10) Patent No.: US 12,383,093 B2
(45) Date of Patent: Aug. 12, 2025

(54) APPARATUS FOR SECURING A CONTAINER TO A BEVERAGE MACHINE

(71) Applicant: BARTESIAN CORP., Chicago, IL (US)

(72) Inventors: Brian Bock, Midlothian, VA (US); Kevin Leppert, Lanexa, VA (US); Ben H. Branson, III, Mechanicsville, VA (US)

(73) Assignee: BARTESIAN CORP.

( * ) Notice: Subject to any disclaimer, the term of this patent is extended or adjusted under 35 U.S.C. 154(b) by 378 days.

(21) Appl. No.: 17/847,940

(22) Filed: Jun. 23, 2022

(65) Prior Publication Data

US 2023/0414032 A1  Dec. 28, 2023

(51) Int. Cl.
*A47J 31/44* (2006.01)

(52) U.S. Cl.
CPC ................................. *A47J 31/4425* (2013.01)

(58) Field of Classification Search
CPC .. A47J 31/4425; A47J 31/407; A47J 31/5255; A47J 31/405; B65D 85/8055; B65D 85/8049
USPC ......................................................... 99/430
See application file for complete search history.

(56) References Cited

U.S. PATENT DOCUMENTS

| 7,677,158 | B2 * | 3/2010 | McDuffie | A47J 31/5253 99/302 R |
| 2005/0076788 | A1 * | 4/2005 | Grant | A47J 31/58 99/279 |
| 2006/0090653 | A1 * | 5/2006 | McDuffie | A47J 31/52 99/279 |
| 2010/0193544 | A1 * | 8/2010 | Rusch | B67D 1/0007 222/82 |
| 2019/0059636 | A1 * | 2/2019 | Fedorak | A47J 31/407 |

FOREIGN PATENT DOCUMENTS

WO    WO-2019192483 A1    10/2019

* cited by examiner

*Primary Examiner* — Eric S Stapleton
(74) *Attorney, Agent, or Firm* — PERRY + CURRIER INC

(57) ABSTRACT

The present disclosure describes a beverage machine for dispensing liquids from a container and an apparatus for securing said container to the beverage machine. The container is removably received by a resilient sealing ring which can be tightened around the container using a rotatable bracket. Through a system of interlocking teeth, a plurality of resilient sealing rings may be operated by a single actuator so that multiple containers can be secured to the machine more or less simultaneously.

12 Claims, 13 Drawing Sheets

APPARATUS FOR SECURING A CONTAINER TO A BEVERAGE MACHINE

BACKGROUND

Various machines have been developed in recent years that enable consumers to quickly prepare a single serving of a hot beverage, such as coffee, tea, soup, or hot chocolate. When preparing a single cup of a hot beverage, these machines provide a stream of heated liquid to a capsule containing the dry crystallized ingredients. Conventional beverage machines and capsules are generally not suitable for preparing a single serving of a mixed beverage (e.g. a single serving of a mixed drink comprising alcohol, or juices and water) because conventional machines are generally configured to provide a single liquid, typically water.

Cocktail beverage machines, such as WO2017149479A1, prepare beverages from one or more sources including removable spirit bottles. The spirit bottles are inserted into a spirit bottle holder and snapped into place. To remove, the bottle is tipped slightly and slowly pulled up.

SUMMARY

An aspect of the specification provides an apparatus for securing a container to a beverage machine that includes a resilient sealing ring disposed on the beverage machine and a bracket surrounding the resilient sealing ring. The resilient sealing ring has an opening for receiving a container such that the inner surface of the resilient ring faces the container. On the outer surface of the resilient sealing ring, there is a recess. The inner surface of the bracket faces the sealing ring and includes a protrusion for cooperating with the outer surface of the resilient sealing ring. The bracket can be rotated between an unlocked orientation characterized in that the protrusion is aligned with the recess and a locked orientation characterized in that the protrusion is aligned with a non-recessed portion of the resilient sealing ring. In the locked orientation, the protrusion presses on the resilient sealing ring which secures the resilient sealing ring to the container.

BRIEF DESCRIPTION OF THE DRAWINGS

Embodiments are described with reference to the following figures.

DETAILED DESCRIPTION

The present disclosure provides a beverage machine and an apparatus for securing containers to the beverage machine. The containers are for storing liquids to be dispensed through the beverage machine, and the apparatus is configured to secure two or more containers substantially simultaneously. Each container is removably received by a resilient sealing ring which can be tightened around the container to secure the container. Through a system of interlocking teeth, each of the resilient sealing rings may be operated by a single actuator so that multiple containers can be secured to the machine more or less simultaneously.

Figure 1:
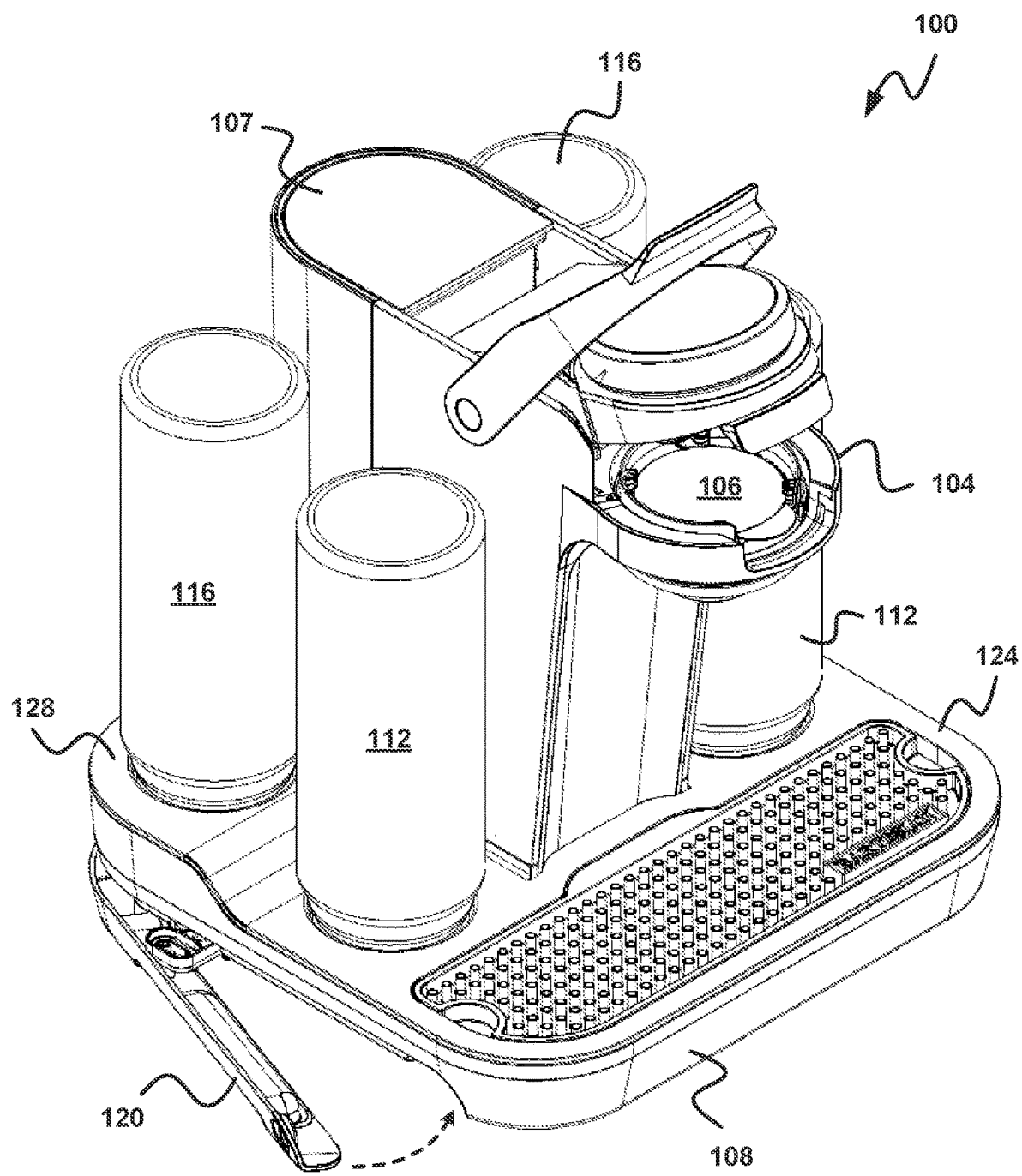
FIG. 1 is a perspective view of a beverage machine with containers.

A beverage machine is indicated generally at 100 in FIG. 1. Beverage machine 100 includes a capsule receiver 104 for receiving a capsule 106 containing one or more ingredients for preparing a beverage. Examples of ingredients include liquids and/or solids, such as juice concentrates, spices, extracts, and the like.

Beverage machine 100 may further include one or more sources of liquid (e.g. water, juices, spirits, and the like) for dispensing through capsule 106. One example (not shown) of a source of water is a connection to a faucet for providing tap water to the capsule 106. The sources of liquid may include one of more reservoirs 107 for storing a liquid. Reservoir 107 may be fixed to a base 108 for supporting reservoir 107 and supporting an apparatus (shown later in FIG. 4) for securing containers. In some examples, reservoir 107 is used to store water.

For further versatility, and to increase the variety of beverages that can be prepared, beverage machine 100 includes at least one removable container 112, 116 (e.g., a bottle or other suitable container, fabricated from any suitable combination of impermeable materials) for storing a liquid to be dispensed through capsule 106. In the example shown in FIG. 1, beverage machine 100 includes 4 removable containers for dispensing liquid—two lower containers 112 and two upper containers 116—however the number of containers is not particularly limited. In the example shown in FIG. 1, lower containers 112 and upper containers 116 are vertically offset due to the shape of base 108, which includes a lower surface 124 for supporting lower containers 112 and an upper surface 128 for supporting upper containers 116. This arrangement may allow a user to see upper containers 116 which are positioned behind lower containers 112, when viewed from the front of beverage machine 100. However, containers 112, 116 need not be positioned as illustrated, and other arrangements are contemplated. In another example, all containers 112, 116 are arranged in the same plane. In a further example, the containers 112 at the front of the machine 100 are not directly in front of the containers 116 as illustrated, but are instead closer together or further apart than the containers 116. In yet a further example, the containers 112 in the front of the machine 100 are raised relative to the containers 116 in the rear.

Figure 2:
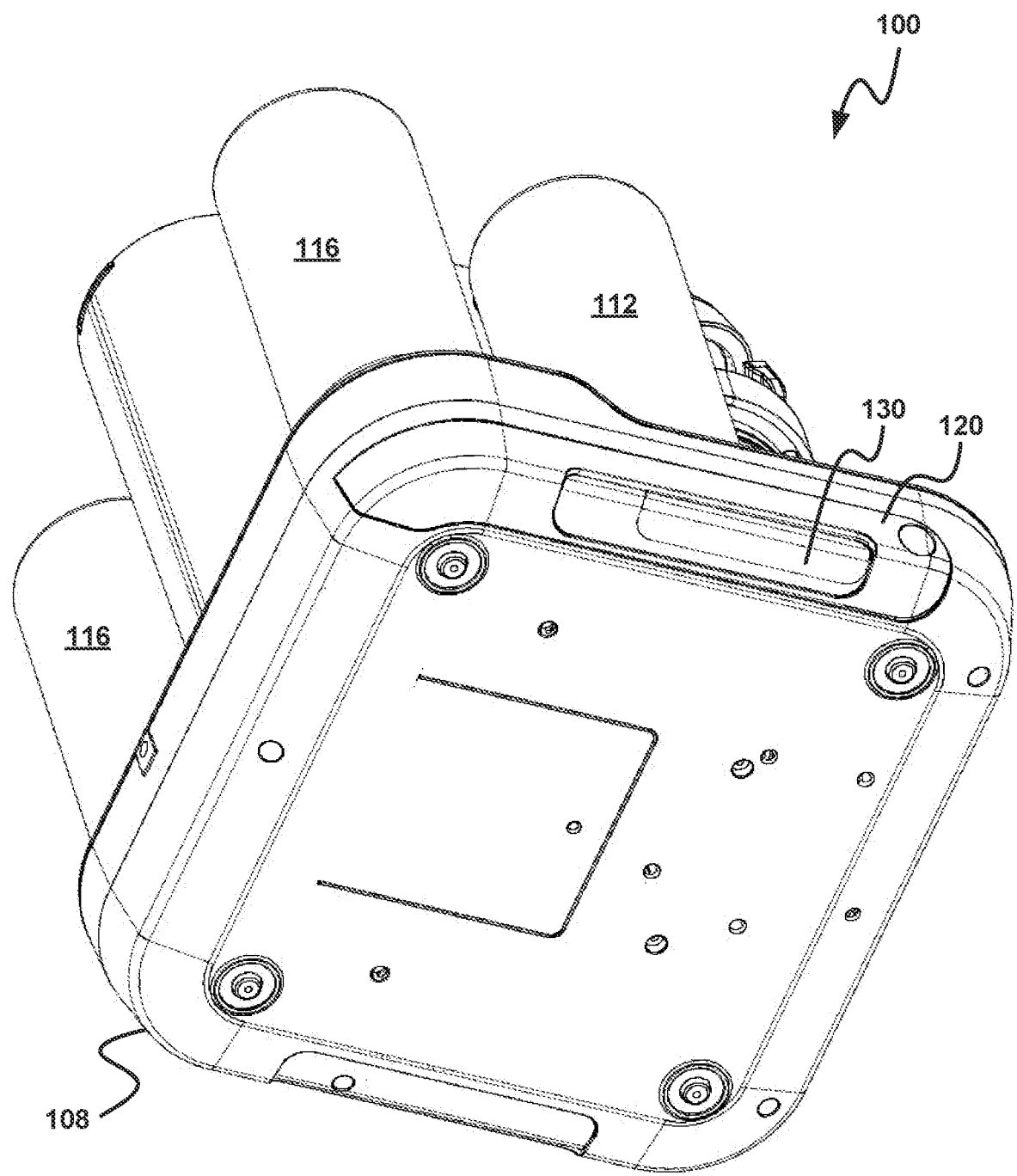
FIG. 2 is another perspective view of the beverage machine of FIG. 1.

Containers 112, 116 are removably secured to base 108 using an actuator 120. The machine 100 includes an apparatus (described in greater detail below) for locking the containers 112, 116. The apparatus has a locked orientation in which the containers 112, 116 are secured to the machine 100 and an unlocked orientation in which the containers 112, 116 are released from the machine 100. The apparatus is switched between the locked and unlocked orientations via movement of the actuator 120. When actuator 120 is in a first position, the apparatus is set in the locked configuration and at least two of containers 112, 116 are locked to beverage machine 100. When actuator 120 is in a second position (as shown in FIG. 1) the apparatus is set in the unlocked configuration and at least two of containers 112, 116 are unlocked from beverage machine 100. Actuator 120 comprises a lever arm in the illustrated example. For aesthetic reasons, and to prevent accidental engagement or disengagement, actuator 120 may be flush with an exterior surface of base 108 when the actuator is in the first position, as shown in FIG. 2. Actuator 120 may further include a recessed handle 130, allowing user to better grip actuator 120.

Figure 3:
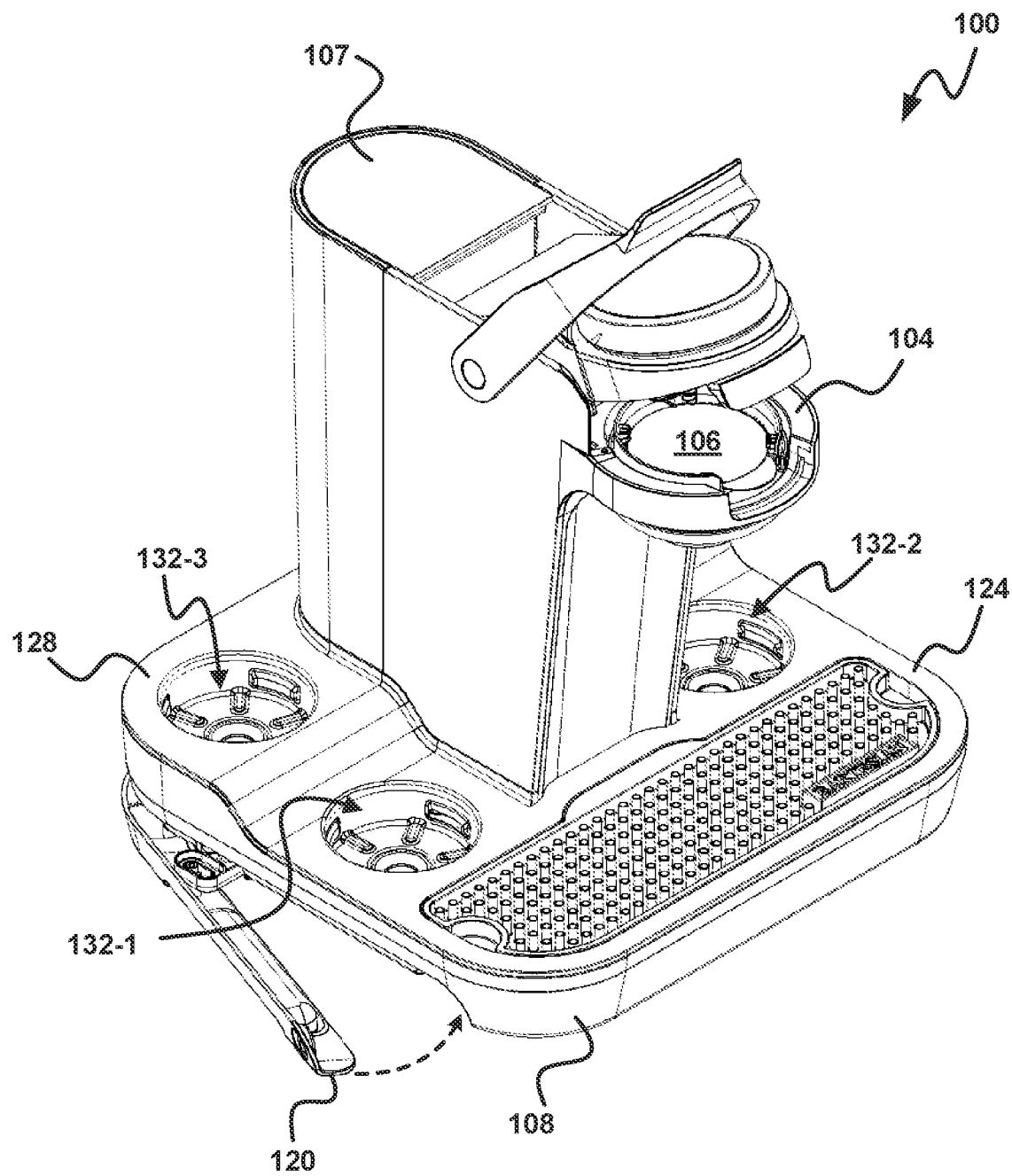
FIG. 3 is a perspective view of the beverage machine of FIG. 1 showing a socket for receiving a container.

As shown in FIG. 3, the above-mentioned apparatus for securing the containers 112, 116 includes one or more sockets 132-1, 132-4, 132-3, 132-4 (not visible in FIG. 3) (generically referred to herein as "socket 132" or collectively as "sockets 132". This nomenclature is used throughout) for receiving containers 112, 116. Sockets 132 may be configured to receive the containers 112, 116 when actuator 120 is in the second position, as depicted in FIG. 3. After one or more containers 112, 116 are inserted into one or more sockets 132, actuator 120 is moved from the second position to the first position. In the first position, sockets 132 secure the containers 112, 116 to beverage machine 100. When actuator 120 is moved back into second position, containers 112, 116 can be removed from sockets 132.

Figure 4:
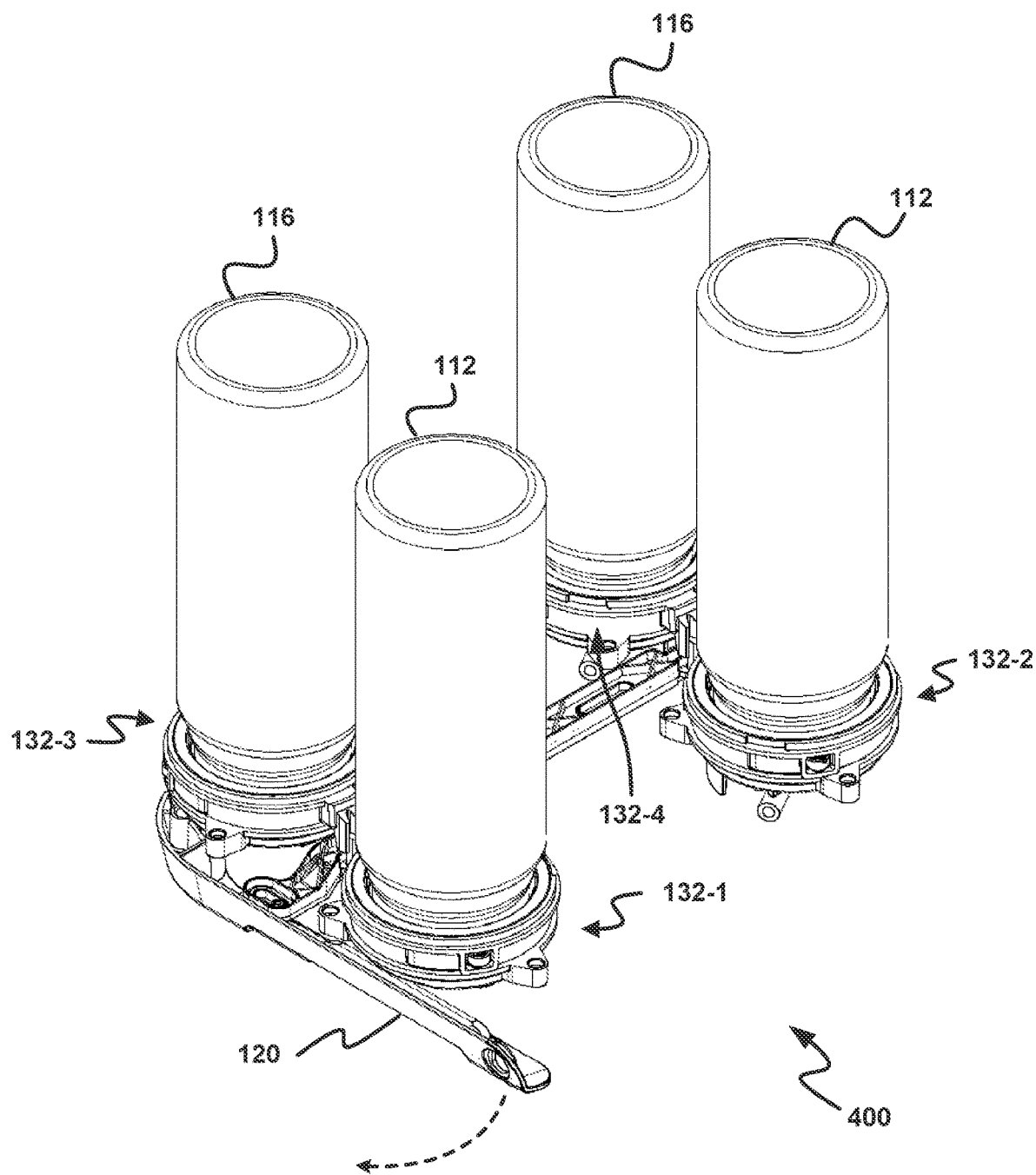
FIG. 4 is a perspective view of a container securing apparatus with containers, a resilient sealing ring, an upper bracket, a fixing ring, and a lower bracket.

FIG. 4 shows the afore-mentioned apparatus at 400 for securing containers 112, 116 to beverage machine 100. Apparatus 400 is operated by actuator 120, which controls apparatus 400 to lock and unlock containers 112, 116 to and from beverage machine 100. In FIG. 4, actuator is shown in first position so containers 112, 116 are secured to beverage machine 100. Apparatus 400 includes sockets 132 mentioned in connection with FIG. 3 for each container 112, 116 to be secured to beverage machine 100.

Figure 5:
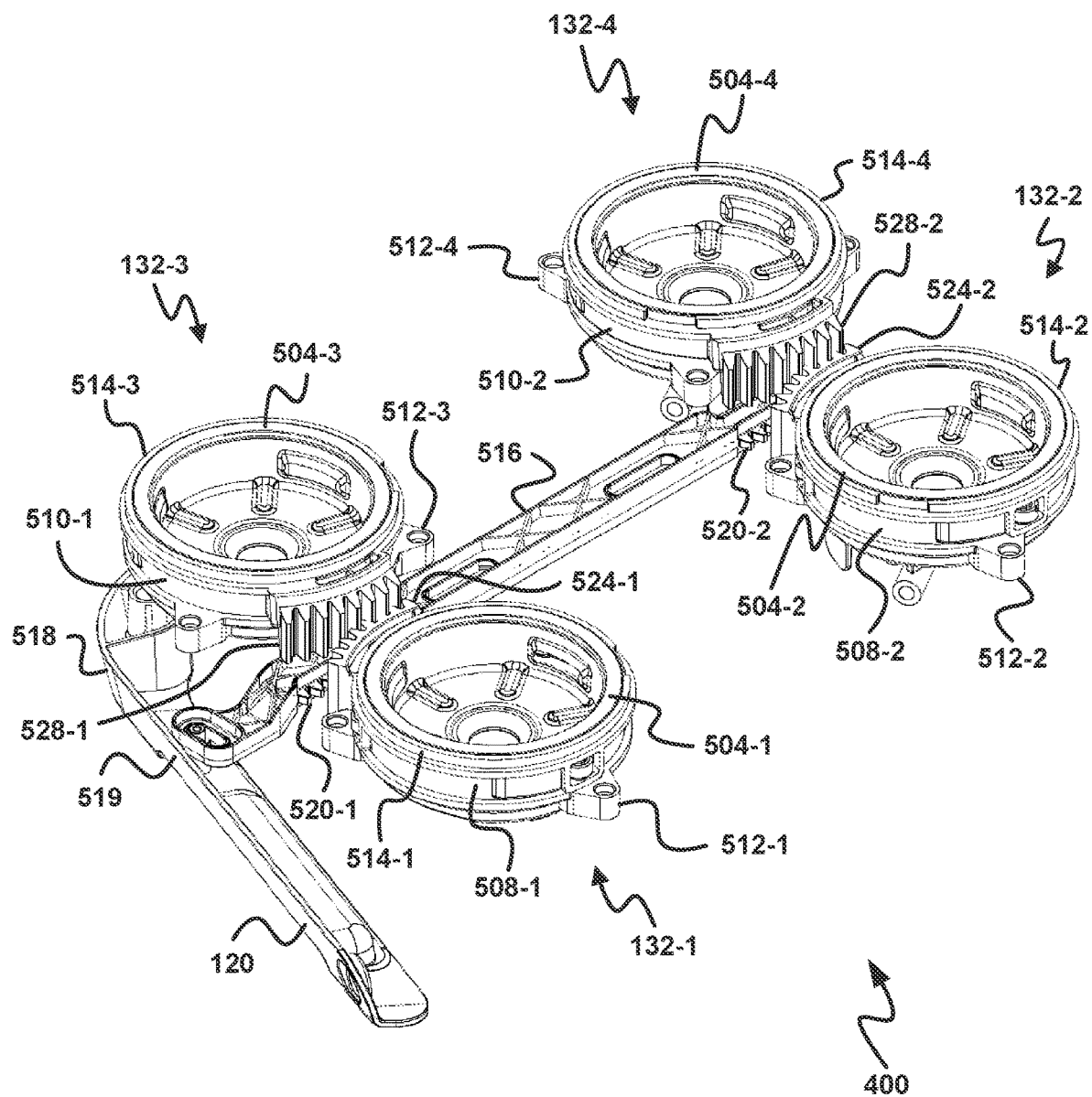
FIG. 5 is a perspective view of the container securing apparatus of FIG. 4 without containers.

Apparatus 400 is shown in greater detail in FIG. 5. In this view, apparatus 400 is depicted without containers 112, 116. Socket 132-1 includes sealing ring 504-1 for receiving container 112, bracket 508-1 surrounding resilient sealing ring 504-1, fixing ring 512-1 for securing socket 132-1 to beverage machine 100, and cover 514-1 for securing resilient sealing ring 504-1 to beverage machine 100. Socket 132-2 includes sealing ring 504-2 for receiving container 112, bracket 508-2 surrounding resilient sealing ring 504-2, fixing ring 512-2 for securing socket 132-2 to beverage machine 100, and cover 514-2 for securing resilient sealing ring 504-2 to beverage machine 100. Socket 132-3 includes sealing ring 504-3 for receiving container 116, bracket 510-1 surrounding resilient sealing ring 504-3, fixing ring 512-3 for securing socket 132-3 to beverage machine 100, and cover 514-3 for securing resilient sealing ring 504-3 to beverage machine 100. Socket 132-4 includes sealing ring 504-4 for receiving container 116, bracket 510-2 surrounding resilient sealing ring 504-4, fixing ring 512-4 for securing socket 132-3 to beverage machine 100, and cover 514-4 for securing resilient sealing ring 504-4 to beverage machine 100.

To secure containers 112, 116 to beverage machine 100, bracket 508-1 is rotated around resilient sealing ring 504-1, bracket 508-2 is rotated around resilient sealing ring 504-2, bracket 510-1 is rotated around resilient sealing ring 504-3, and bracket 510-2 is rotated around resilient sealing ring 504-4. In this example, manipulation of the actuator 120 causes the rotation of all four brackets 508-1, 508-2, 510-1, 510-2 substantially simultaneously. Actuator 120 is connected to each of the brackets 508, 510 via an arm 516. In this example, actuator 120 is pivotally connected to beverage machine 100 at an end 518 and further connected to arm 516 at a portion 519 spaced from end 518. Arm 516 is connected to actuator 120 in such a way that arm 516 can move relative to actuator 120 via the connection. In the example shown, arm 516 is pivotally connected to actuator 120. Thus, when actuator 120 pivots around end 518, arm 516 moves linearly between a first position and a second position. As arm 516 moves between the first position and the second position, brackets 508, 510 rotate by virtue of their direct or indirect (in the case of the brackets 510) engagement with teeth 520 disposed on arm 516.

In the example shown in the figures, actuator 120 is depicted as a lever arm, however actuator 120 is not particularly limited. In other examples, actuator 120 may be a motor, a push-button, turn-crank, or other mechanism for driving arm 516. In further examples, apparatus 400 does not include an actuator and arm 516 can be directly driven by a user. The examples show that actuator 120 (or arm 516, in examples without an actuator) is accessible from the exterior of beverage machine 100, however actuator is not particularly limited. In other examples, actuator 120 includes a motor and a receiver. The motor drives arm 516 in response to receiving an input signal at the receiver.

At least one of the brackets 508-1 and 510-1 engage directly with the arm 516. The other of the brackets 508-1 and 510-1 can engage with the arm 516 directly, or indirectly, via the directly-engaged bracket. Similarly, at least one of the brackets 508-2 and 510-2 engage directly with the arm 516, while the other of the brackets 508-2 and 510-2 can engage with the arm 516 directly, or indirectly via the directly-engaged bracket.

In the illustrated example brackets 510-1, 510-2 engage indirectly with teeth 520 on arm 516. As shown in FIG. 5, sockets 132-1 and 132-2 are lower than sockets 132-3 and 132-4. Sockets 132-1 and 132-2 include lower brackets 508-1 and 508-2 respectively which directly engage with teeth 520-1, 520-2 on arm 516 via teeth 524-1, 524-2. Sockets 132-3 and 132-4 include upper brackets 510-1 and 510-2 which engage with teeth 524-1, 524-2 on lower brackets 508-1, 508-2 via teeth 528-1, 528-2. Both teeth 520-1 (disposed on arm 516) and teeth 528-1 (disposed on upper bracket 510-1) engage with teeth 524-1 on lower bracket 508-1. Similarly, teeth 520-2 (disposed on arm 516) and teeth 528-2 (disposed on upper bracket 510-2) engage with teeth 524-2 on lower bracket 508-2. In this configuration, sockets 132-1 and 132-2 may be positioned in a horizontal plane that is above or below a horizontal plane in which sockets 132-3 and 132-4 are positioned, however sockets 132 are not particularly limited. An advantage of this configuration is that it is more compact than the configuration described above in which teeth 528 directly engage with teeth on arm 516. Since teeth 528 instead engage with teeth 524, socket 132-1 is proximal to socket 132-3, and socket 132-2 is proximal to socket 132-4. This may result in a beverage machine 100 that is smaller than a machine 100 in which teeth 528 engage with teeth on arm 516.

In some examples, each of brackets 508, 510 engage directly with arm 516. Brackets 508, 510 include teeth 524, 528 which can interlock with teeth on arm 516. Bracket 508-1 includes teeth 524-1 which interlock with teeth 520-1 on arm 516. Bracket 508-2 includes teeth 524-3 which interlock with teeth 520-2 on arm 516. Bracket 510-1 includes teeth 528-1 which interlock with another set of teeth (not shown) on arm 516. Bracket 510-2 includes teeth 528-2 which interlock with another set of teeth (not shown)

on arm 516. The another set of teeth may be disposed on a side of bracket 508 opposite or adjacent to teeth 524. The interlocking engagement between teeth 524, 528, 520 causes brackets 508, 510 to rotate when arm 516 moves between the above-mentioned first and second positions. In this configuration, sockets 132 may be positioned in the same horizontal plane, however sockets 132 are not particularly limited.

Each of sockets 132-1, 132-2, 132-3, 132-4 further includes cover 514. Cover 514 surrounds resilient sealing ring 504. Cover 514 is further surrounded by bracket 508 (in sockets 132-1 and 132-2) or bracket 510 (in sockets 132-3 and 132-4) which is configured to rotate around cover 514. Cover 514 secures resilient sealing ring 504 to beverage machine 100.

Figure 6A:
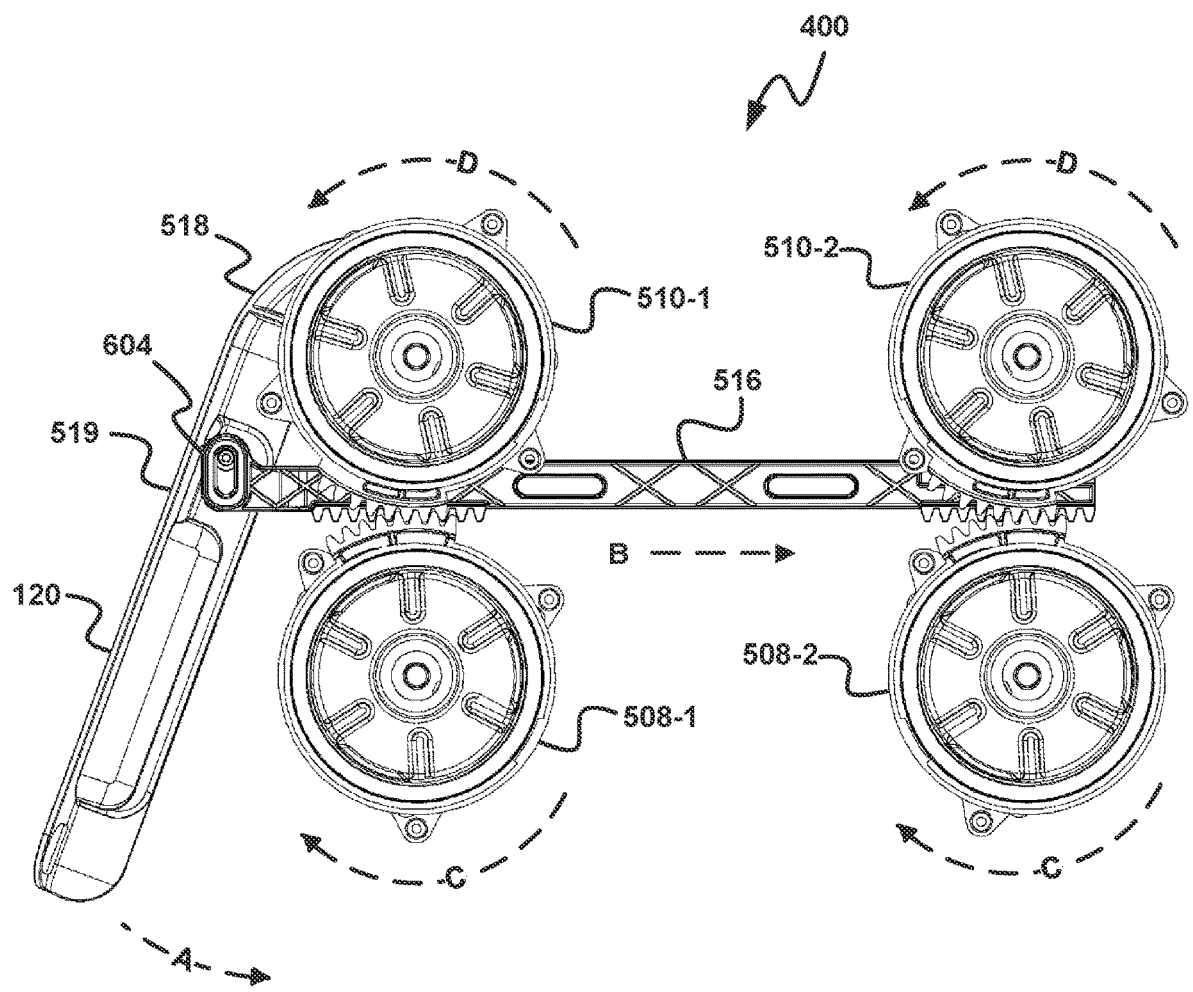
FIG. 6A is a top view of the container securing apparatus of FIG. 5, in an unlocked orientation.
Figure 6B:
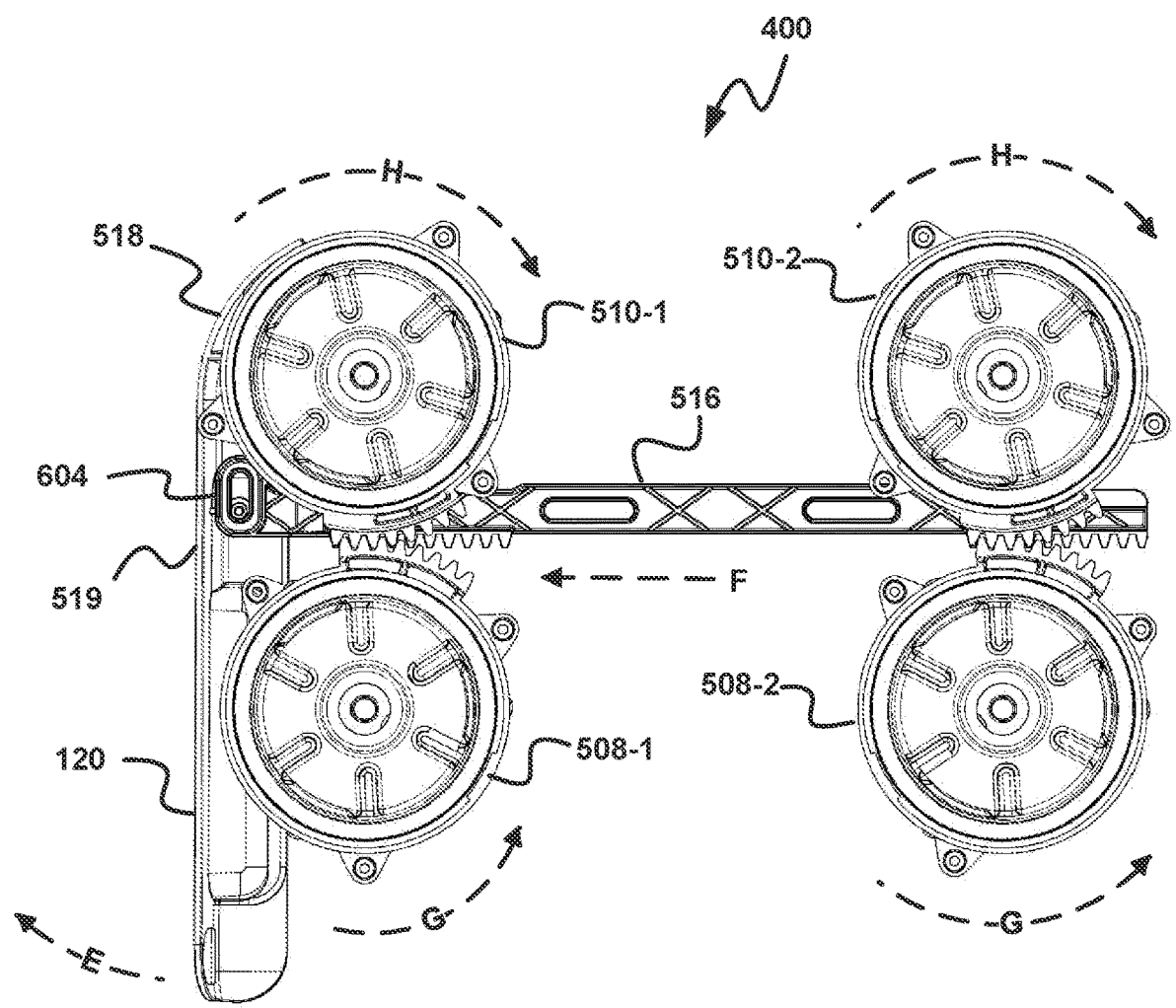
FIG. 6B is a top view of the container securing apparatus of FIG. 5, in a locked orientation.

FIG. 6A shows a top view of apparatus 400 in the unlocked orientation. This view depicts the directions in which arm 516, and brackets 508, 510 may move in response to movement of the actuator 120. In FIG. 6A, actuator 120 is in the second position and is configured to rotate around end 518 in direction A until it reaches the first position. One end 604 of arm 516 is pivotally attached to portion 519 of actuator 120 which is spaced from end 518. As a result of this connection, arm 516 is driven in direction B in response to actuator 120 rotating in direction A. Due to the engagement of teeth 520 on arm 516 with teeth 524 on brackets 508-1, 508-2, brackets 508-1, 508-2 rotate in direction C when arm 516 is driven in direction B. Due to the engagement of teeth 524 on brackets 508-1, 508-2 with teeth 528 on brackets 510-1, 510-2, brackets 510-1, 510-2 rotate in direction D when brackets 508-1, 508-2 rotate in direction C. This process reconfigures apparatus 400 to the locked orientation as shown in FIG. 6B wherein the actuator 120 is in the first position.

When actuator 120 is manipulated to pivot in a direction opposite to A (as indicated at E), actuator 120 moves from the first position to the second position, arm 516 slides in a direction opposite to B (as indicated at F), brackets 508 rotate in a direction opposite to C (as indicated at G), and brackets 510 rotate in a direction opposite to D (as indicated at H). These motions cause apparatus 400 to return to the unlocked orientation shown in FIG. 6A.

Figure 7:
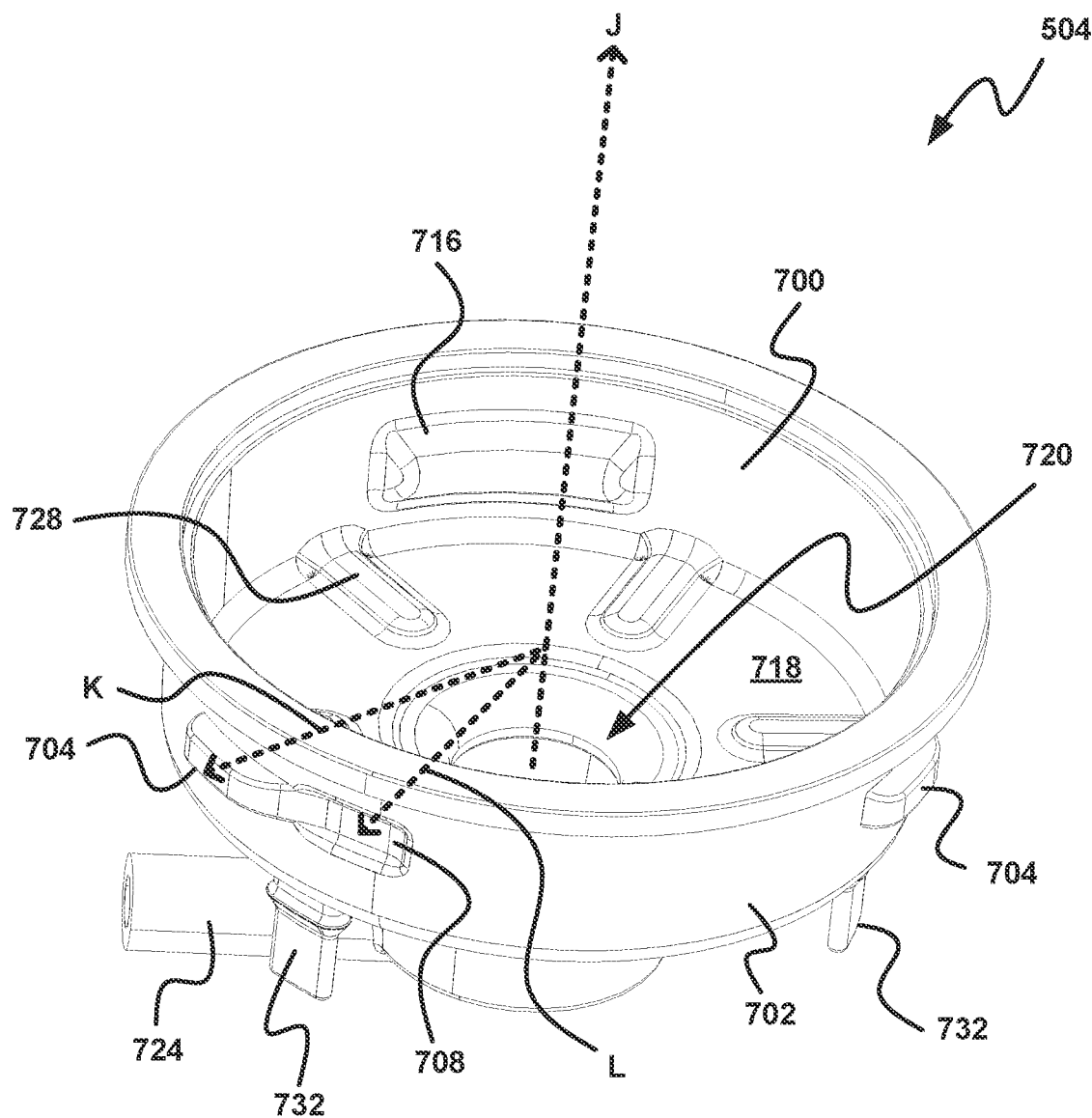
FIG. 7 is a perspective view of the resilient sealing ring of FIG. 5.

Further details of resilient sealing ring 504 are shown in FIG. 7. Sealing ring 504 has an inner surface 700 that faces removable containers 112 or 116 and an outer surface 702 opposite inner surface 700. Resilient sealing ring 504 comprises a resilient material, e.g., a rubber or other suitable material. Due to the resilience of resilient sealing ring 504, resilient sealing ring 504 can be compressed between bracket 508, 510 and container 112, 116, securing container 112, 116 to beverage machine 100.

Compression of resilient sealing ring 504 results from the rotation of brackets 508, 510, which engage features on outer surface 702. Outer surface 702 is variable and may include one or more lobes, recesses, protrusions, or other features which vary the radius of outer surface 702 relative to a central axis of sealing ring 504. In the example shown in FIG. 7, outer surface 702 includes an outer protrusion 704 which extends outwardly from resilient sealing ring 504, and a recess 708 which extends inwardly. Outer protrusion 704 increases the radius of outer surface 702 relative to central axis J, as shown at K, while recess 708 decreases the radius of outer surface 702 relative to central axis J, as shown at L. In this example, outer protrusion 704 is adjacent to recess 708, however in other examples, outer protrusion 704 is spaced from recess 708. In the example shown, the resilient sealing ring 504 includes three protrusions 704 and three recesses 708 distributed around the outer surface 702. In another example, resilient sealing ring 504 may include two protrusions 704 and two recesses 708 distributed around the outer surface 702. In a further example, the resilient sealing ring 504 may include four protrusions 704 and four recesses 708 distributed around the outer surface 702. The number of protrusions and recess is not particularly limited, and in fact, resilient sealing ring 504 may have an unequal number of protrusions 704 and recesses 708. In other examples, resilient sealing ring 504 may include only protrusions 704 or only recesses 708.

Containers 112, 116 may be inserted into resilient sealing ring 504 such that an open neck of container 112, 116 is received by resilient sealing ring 504. In order to direct and control the flow of liquid through resilient sealing ring 504, resilient sealing ring 504 may include an enclosed base 718. The enclosed base 718 may further include an inlet 720 in fluid connection with the open neck of container 112, 116 and an outlet 724. Outlet 724 may be in fluid connection with channels in beverage machine 100 for directing fluids from container 112, 116 to capsule 106.

The sealing qualities of resilient sealing ring 504 may be enhanced with one or more protrusions disposed on inner surface 700. Ridges or protrusions 728 may be disposed on the enclosed base 718, extending upwardly towards container 112, 116. Ridges or protrusions 716 may further be disposed on inner surface 700, extending inwardly towards container 112, 116. Protrusions 716 may increase the frictional forces between sealing ring 504 and containers 112, 116. In some examples, such as the example shown in FIG. 7, protrusions 716 are disposed opposite protrusions 704 so that when pressure is applied to protrusions 704, protrusions 716 grip container 112, 116. In further examples, containers 112, 116 include one or more recessions disposed on an outer surface for receiving protrusions 716.

Resilient sealing ring 504 may be secured to beverage machine 100 so that resilient sealing ring 504 does not rotate when the surrounding bracket 508, 510 rotates. For example, resilient sealing ring 504 may be fixed with an adhesive, a fastener, or an interlocking tab. In FIG. 7, resilient sealing 504 includes one or more tabs 732 for interlocking engagement with cover 514. Tabs 732 will be explained in greater detail with respect to FIG. 11.

Figure 8:
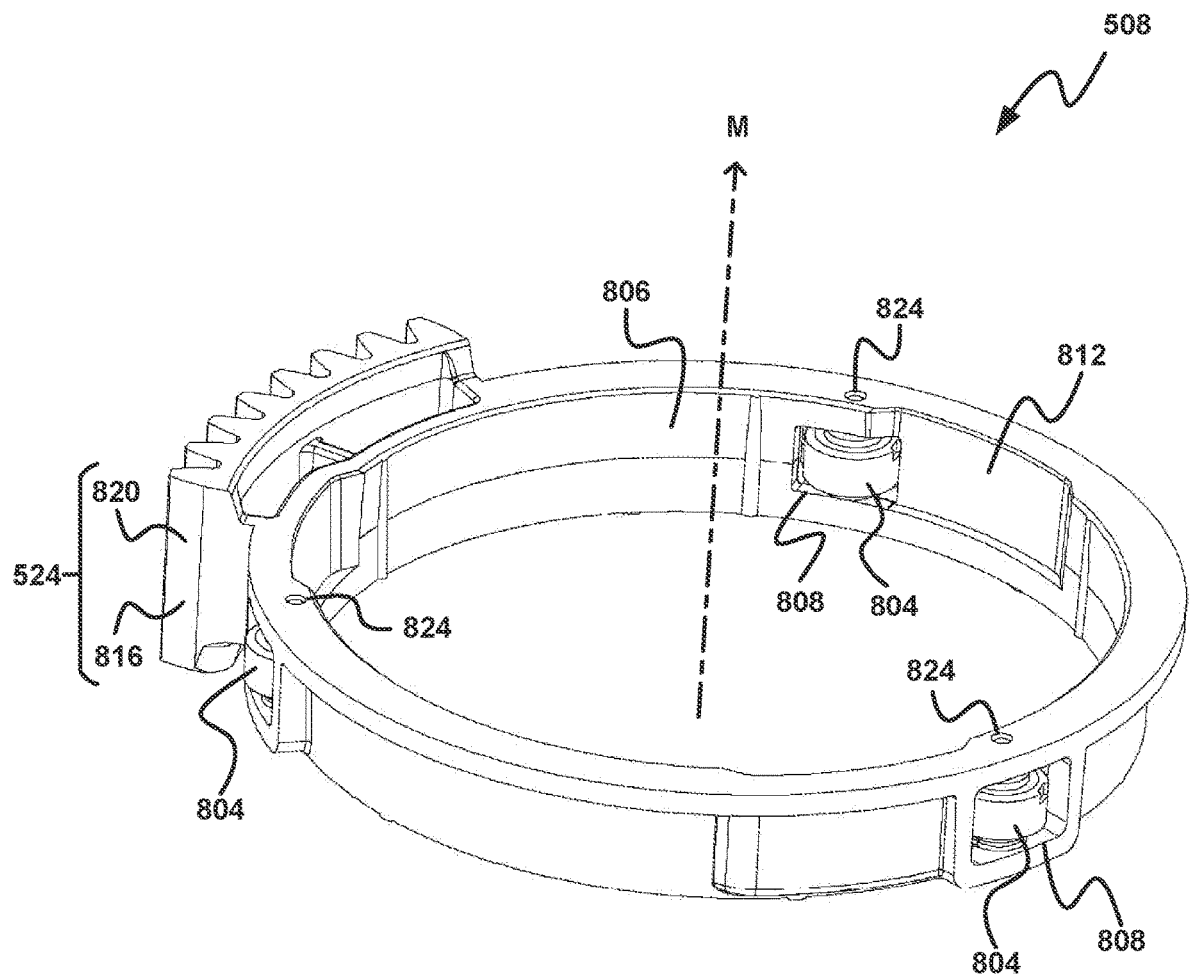
FIG. 8 is a perspective view of the lower bracket of FIG. 5.
Figure 9:
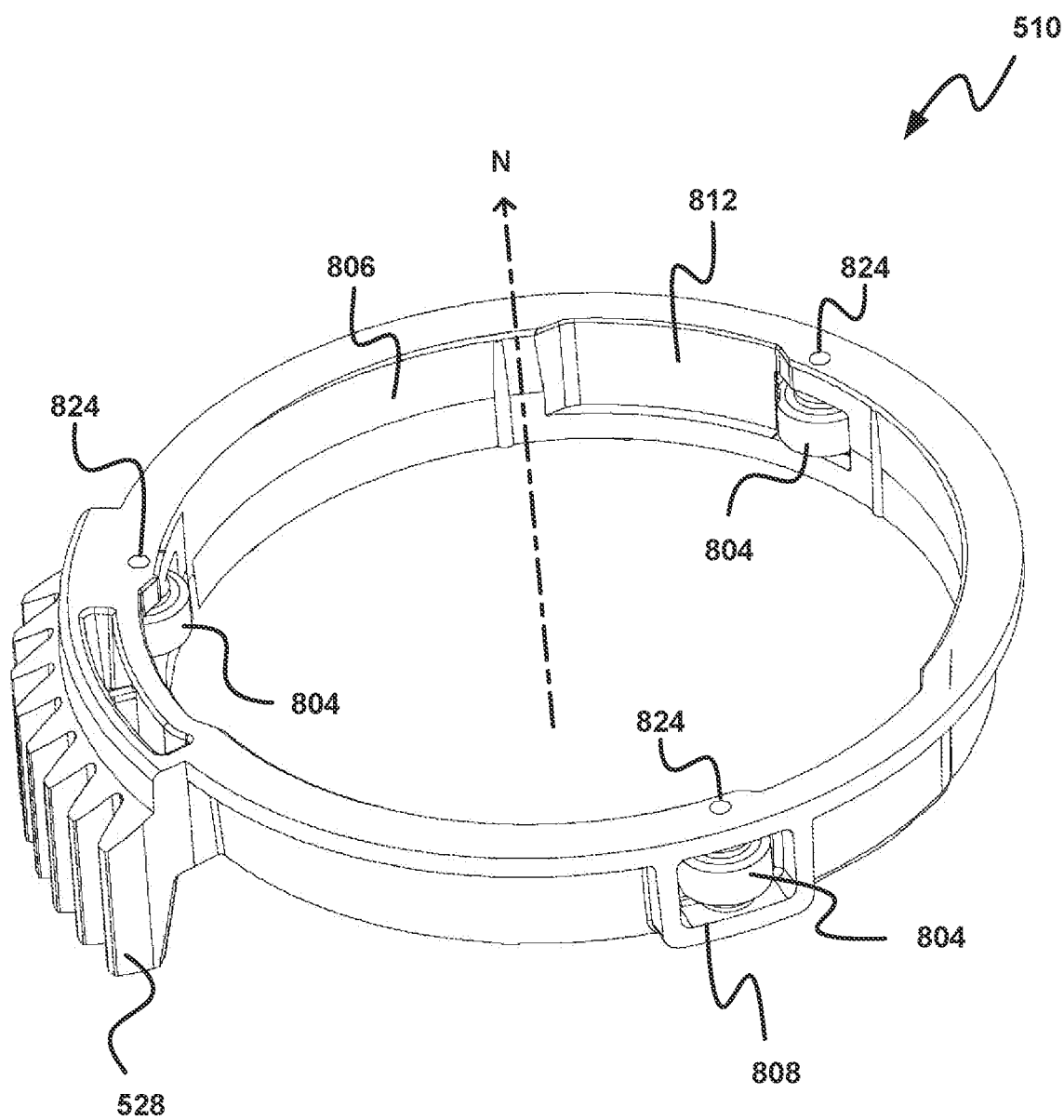
FIG. 9 is a perspective view of the upper bracket of FIG. 5.

FIG. 8 shows lower bracket 508 in greater detail. Similarly, FIG. 9 shows an upper bracket 510 in greater detail. Lower bracket 508 and upper bracket 510 are sized and dimensioned to fit around the outer surface 702 of resilient sealing ring 504. When apparatus 400 is assembled, brackets 508, 510 each surround one of the resilient sealing rings 504. Unlike resilient sealing ring 504, brackets 508, 510 are rotatable. As described above with respect to FIGS. 6A and 6B, brackets 508, 510 rotate between the unlocked orientation and the locked orientation due to interlocking engagement between teeth 520 and teeth 524 or 528.

Teeth 524 may include a lower portion 816 and an upper portion 820, as shown in FIG. 8. In this example, lower portion 816 is for engaging teeth 520 on arm 516, while upper portion 820 is for engaging teeth 528 on upper bracket 510, however other arrangements are contemplated. In another arrangement, upper portion 820 is for engaging teeth 520 while lower portion 816 is for engaging teeth 528. In a further example, teeth 528 engage another set of teeth on lower bracket 508. The another set of teeth may be disposed on a side of bracket 508 opposite or adjacent to teeth 524.

Teeth 528 do not necessarily require an upper portion and a lower portion because teeth 528 are configured to interlock with only one other set of teeth (either teeth 524 on bracket 508 or a set of teeth on arm 516). In the example shown in FIG. 9, teeth 528 protrude down from bracket 510 to engage an upper portion of teeth 524. This configuration increases the degree to which brackets 510-1 and 510-2 are raised above brackets 508-1 and 508-2, enhancing the stepped shape of beverage machine 100. In another example, where teeth 528 engage with lower portion 816 of teeth 524, teeth 528 may protrude up from bracket 510. This configuration would increase the degree to which brackets 510-1 and 510-2 are lowered below brackets 508-1 and 508-2.

Brackets 508, 510 further comprise one or more protrusions 804 which extend inwardly from an inner surface 806. When brackets 508, 510 are in the unlocked orientation, protrusion 804 aligns with recess 708. In the unlocked orientation, protrusion 804 does not apply pressure to resilient sealing ring 504, and therefore container 112, 116 is not secured to beverage machine 100. When brackets 508, 510 are in the locked orientation, protrusion 804 instead aligns with a non-recessed portion of outer surface 702. The non-recessed portion may be protrusion 704 or any other portion of outer surface 702 that extends out further than recess 708. Therefore, protrusion 804 engages outer surface 702 and presses resilient sealing ring 504 against container 112, 116. In the locked orientation, container 112, 116 is secured to beverage machine 100. In examples where resilient sealing ring 504 includes protrusion 704, protrusion 804 aligns with protrusion 704 when brackets 508, 510 are in the locked orientation.

One example of a protrusion 804 is a wheel, as shown in FIGS. 8 and 9. Protrusion 804 comprises a wheel which rotates about an axis 824 connected to bracket 508, 510. Axis 824 may be parallel to the axis of rotation for bracket 508 which is indicated at M in FIG. 8. Axis 824 may similarly be parallel to the axis of rotation for bracket 510 which is indicated at N in FIG. 9. The rotation of protrusion 804 may decrease resistance between resilient sealing ring 504 and protrusion 804, which may facilitate the rotation of brackets 508, 510 about resilient sealing ring 504. In this example, protrusion 804 is disposed within an opening 808 of bracket 508, 510, however, protrusion 804 is not particularly limited. In other examples, protrusion 804 could be secured within a recess disposed on inner surface 806.

Inner surface 806 may further include an aperture or recess sized and dimensioned to accommodate protrusion 704 on bracket 508. FIGS. 8 and 9 show a recess at 812, which is positioned to align with protrusion 704 when bracket 508 is in the unlocked orientation. This may reduce the likelihood of bracket 508 applying pressure to protrusion 704 when bracket 508 is in the unlocked orientation.

Figure 10:
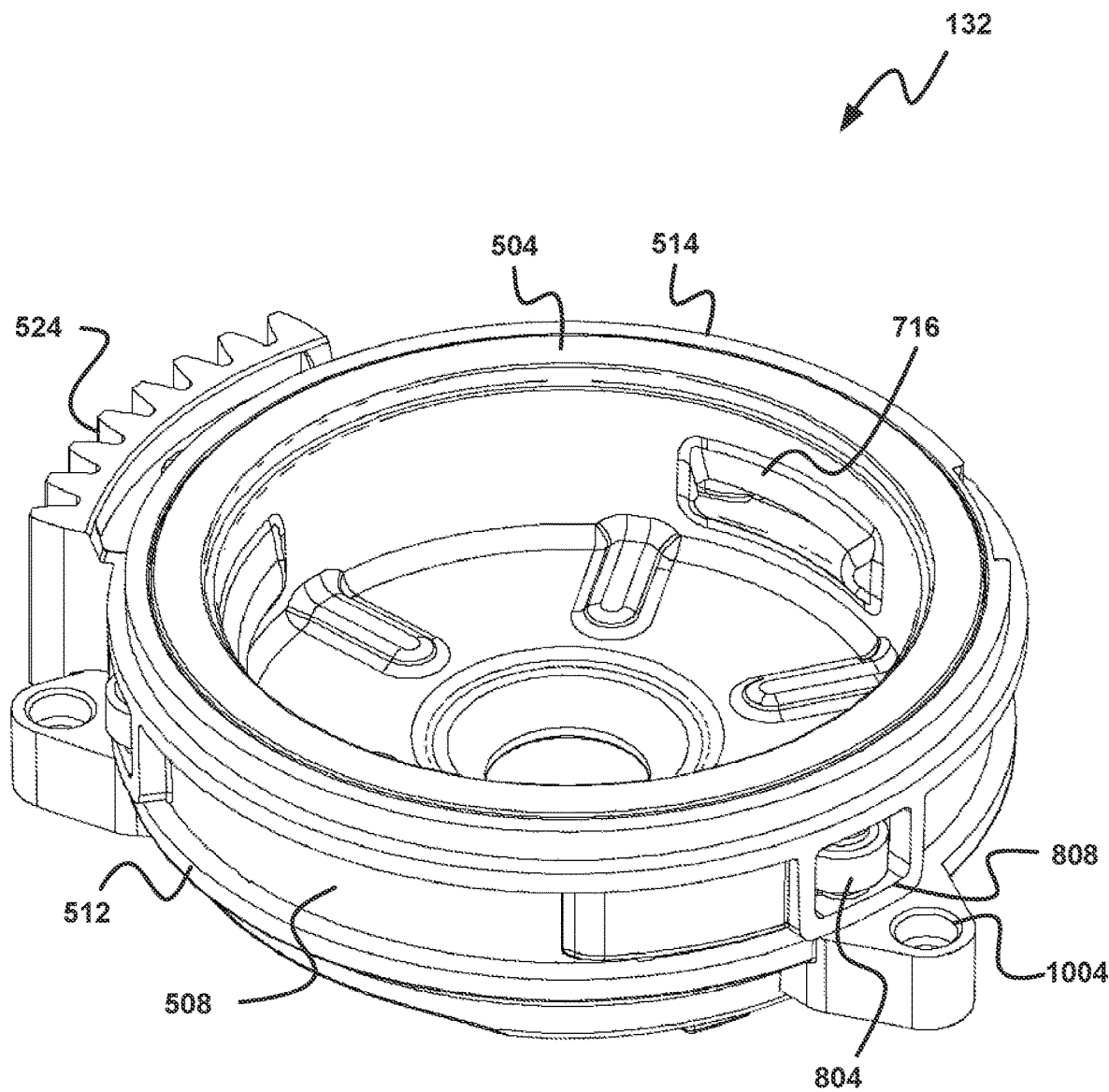
FIG. 10 is a perspective view of the socket of FIG. 3.

FIG. 10 shows an assembled socket 132 including lower bracket 508, resilient sealing ring 504, fixing ring 512, and cover 514. Although lower bracket 508 is depicted in this assembly, upper bracket 510 may be similarly assembled. When socket 132 is assembled, bracket 508 surrounds resilient sealing ring 504 and is configured to rotate around resilient sealing ring 504. Resilient sealing ring 504 is secured to beverage machine 100 with cover 514. Cover 514 surrounds and supports resilient sealing ring 504. Cover 514 may be secured to resilient sealing ring 504 in order to inhibit movement of resilient sealing ring 504. Fixing ring 512 supports cover 514 and bracket 508. In order to prevent the rotation of fixing ring 512, fixing ring 512 may be further fixed to beverage machine 100. A number of fixing means are contemplated including interlocking engagement, adhesives, fasteners, heat bonding, the like, and combinations thereof. In the example shown, fixing ring 512 includes an aperture 1004 for receiving a fastener. The fastener is received by aperture 1004 and further received by an aperture disposed on beverage machine 100 (not shown) such that fixing ring 512 is secured to beverage machine 100 when the fastener is inserted through both apertures. Socket 132 may further include cover 514 for surrounding resilient sealing ring 504.

Figure 11:
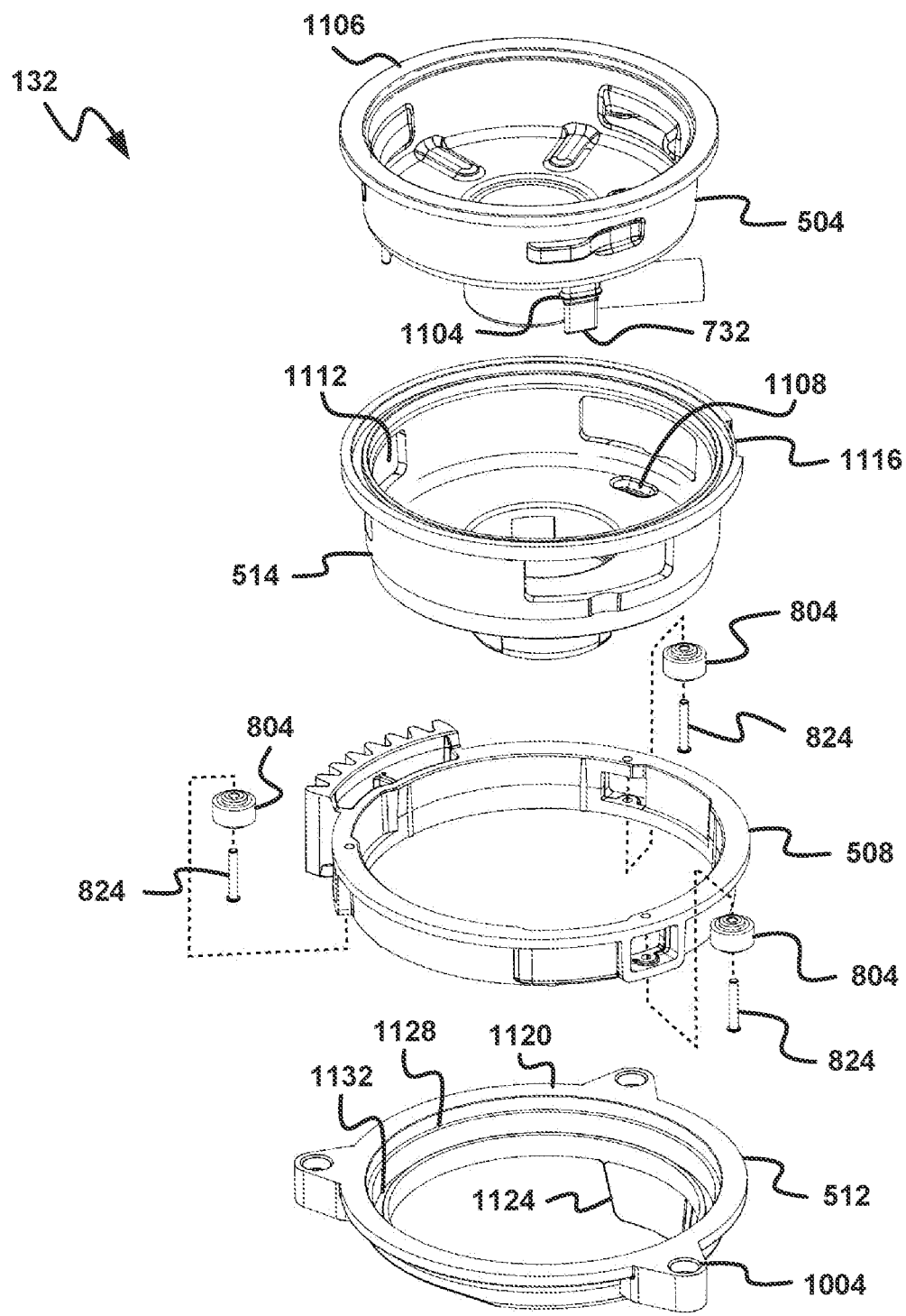
FIG. 11 is an exploded view of the socket of FIG. 3.

FIG. 11 shows an exploded view of socket 132, including resilient sealing ring 504, cover 514, bracket 508, and fixing ring 512. FIG. 11 depicts socket 132-1 or 132-2, however the same configuration may be applied to socket 132-3 or 132-4 by replacing bracket 508 with bracket 510. The description of bracket 508 thus applies equally to bracket 510.

Cover 514 may include one or more apertures 1112, allowing access to outer surface 702 of resilient sealing ring 504, and in particular, recess 708 and protrusion 704. Apertures 1112 allow recess 708 and protrusion 704 to engage with protrusion 804 as necessary. Cover 514 may be secured to resilient sealing ring 504 with any suitable means including interlocking engagement, adhesives, fasteners, heat bonding, the like, and combinations thereof. In the example shown, resilient sealing ring 504 is secured to cover 514 with one or more tabs 732. Tabs 732 may be positioned on the sides or bottom of the outer surface of the resilient sealing ring 504 and extend outwardly. Tabs 732 are sized and dimensioned to be received by one or more apertures 1108 in cover 514. Apertures are positioned to received tabs 732. In other examples, tabs 732 are configured to be received by recesses in cover 514. The interlocking engagement between sealing ring 504 and cover 514 inhibits sealing ring from rotating relative to cover 514. In the example shown in FIG. 11, tab 732 includes a portion 1104 with a diameter wider than the diameter of aperture 1108. In this example, tab 732 comprises a resilient material so that portion 1104 can be forced through aperture 1108, but the portion 1104 inhibits tab 732 from being removed from aperture 1008 after insertion. To further ensure that resilient sealing ring 504 remains secured in socket 132, a portion of the base 108 may engage an upper surface 1106 of resilient sealing ring.

Turning now to cover 514, cover 514 is inhibited from rotating by notch 1116. Notch 1116 is sized and dimensioned to engage with the base 108. Thus, when bracket 508, 510 is rotated around its axis of rotation, neither cover 514 nor resilient sealing ring 504 rotates.

FIG. 11 further shows an exploded view of bracket 508 including axis 824 and protrusion 804. In embodiments where protrusion 804 is a wheel, axis 824 is a wheel shaft that connects protrusion 804 to bracket 508. Protrusion 804 is rotatable around axis 824.

Bracket 508 is supported by fixing ring 512 which includes a surface 1120 for supporting bracket 508. Surface 1120 engages with a bottom surface of bracket 508 to support bracket 508 from below. Fixing ring 512 may be supported by engagement with beverage machine 100 via fasteners received by apertures 1004. Fixing ring 512 may be further supported by engagement with beverage machine 100 via one or more tabs 1124 which protrude outwardly from fixing ring 512. Fixing ring 512 is further configured to support cover 514. Fixing ring 512 may include one or more surfaces 1128, 1120 for engaging a bottom surface of cover 514.

Figure 12:
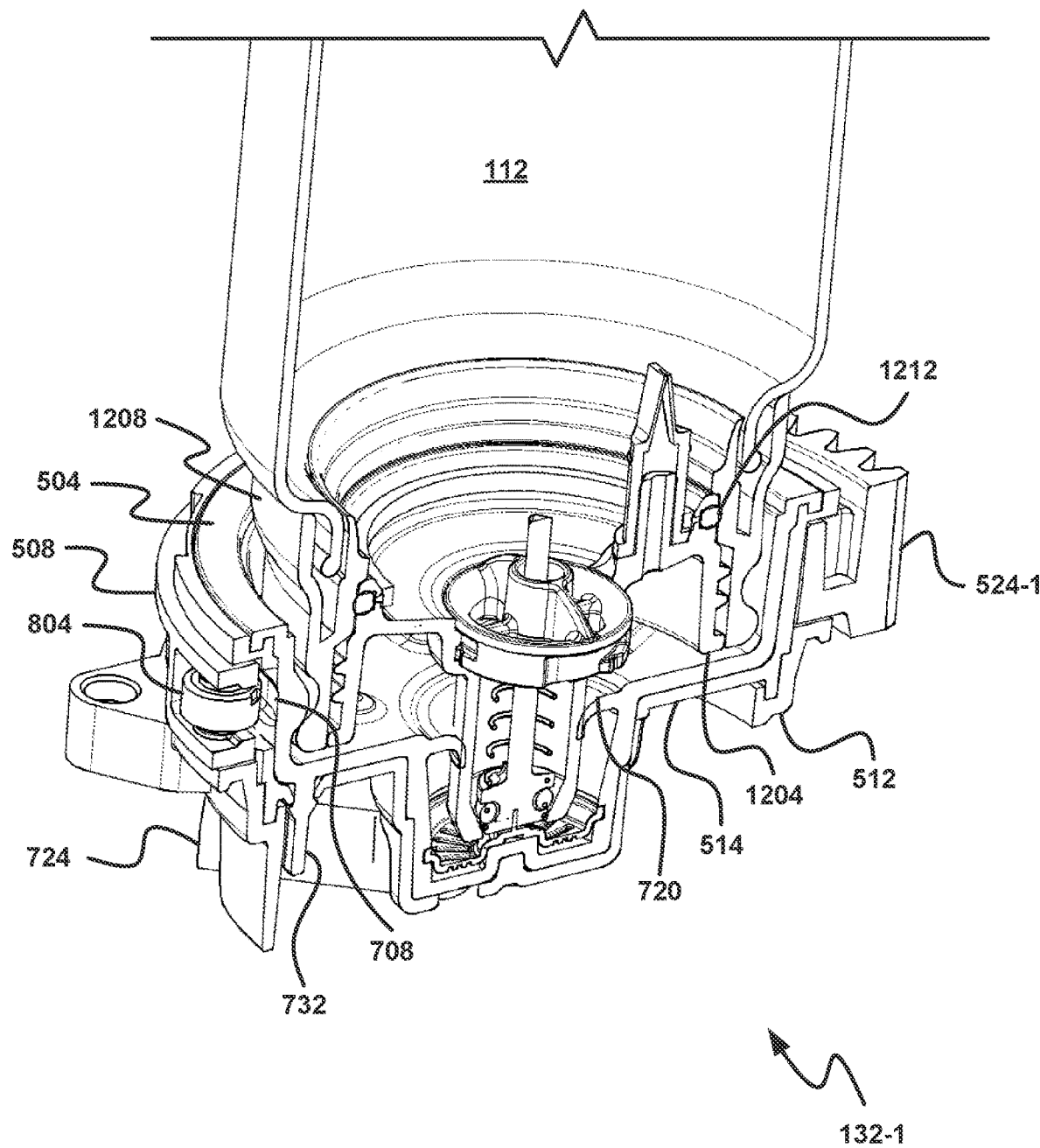
FIG. 12 is a sectional perspective view the socket of FIG. 3, including a container.

Turning now to FIG. 12, a sectional view of socket 132-1 is shown including container 112. Although socket 132-1 is depicted, sockets 132-2, 132-3, and 132-4 may be similarly configured. In this view, bracket 508 is in the unlocked orientation such that protrusion 804 is aligned with recess 708 on resilient sealing ring 504. Since resilient sealing ring 504 is not compressed by protrusion 804, container 112 is removable from socket 132.

Resilient sealing ring 504 need not engage container 112 directly when in locked position. In this example, container 112 includes a lid 1204 for directing fluid from container 112 through inlet 720. Lid 1204 is secured to an open end of container 112 with a ring 1208. Resilient sealing ring 504 receives ring 1208 and is configured to engage ring 1208 when bracket 508 is in the locked orientation. To ensure that the connection between lid 1204 and ring 1208 is impermeable to liquid, an O-ring 1212 may be included between lid 1204 and ring 1208. O-ring 1212 may comprise a resilient material for sealing lid 1204 to ring 1208. In this example, O-ring 1212 is positioned to engage a vertical surface of lid 1204, however in other examples, O-ring 1212 is positioned to engage a horizontal surface of lid 1204. Because various components of socket 132 are stacked vertically in this example, it may be desirable to position O-ring 1212 to engage with a vertical surface, in order to reduce vertical play. This placement may ensure that lid 1204 remains sealed to ring 1208 even if there is vertical displacement of any components of container 112.

A number of advantages will now be clear to a person of skill in the art. Firstly, the present disclosure provides an apparatus for securing and releasing multiple containers with a single action, specifically by engaging the actuator 120 or otherwise driving the arm 516. In the prior art beverage machines, each container needed to be individually secured to the machine. While this option is suitable for beverage machines that draw on a single liquid source, such as water, it becomes cumbersome for a machine that draws on multiple liquid sources. Since some recipes, such as cocktail recipes, require multiple liquids to prepare a beverage, securing multiple containers simultaneously can save time and simplify the process of installing or exchanging containers at the beverage machine. This is particularly useful when preparing a series of beverages that require different liquids. Multiple containers can be rapidly removed after preparing a first beverage and replaced with containers storing different liquids before preparing a second beverage.

Secondly, the present disclosure provides an apparatus for securing and releasing containers using an actuator that is accessible from the exterior of the beverage machine. In prior art beverage machines, containers are attached to the machine my manipulating the container itself. This method can increase the likelihood of damaging the container and can be frustrating for users since the locking mechanism is invisible to the user during and after installation. In contrast, the actuator of the present disclosure may be visible from the outside of the machine so that the user can clearly see whether the apparatus is locked or unlocked. The user does not need to handle the containers while engaging or disengaging the actuator, so the risk of damaging a container is lowered as compared to the prior art.

Thirdly, the present disclosure provides an apparatus that allows the containers to be arranged in a variety of positions. Due to the length of the arm and the alignment of teeth on the upper and lower brackets, sockets for installing containers can be both vertically and horizontally spaced. This flexibility allows containers to be positioned so as to improve visibility and to create a visually interesting arrangement.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus for securing a container to a beverage machine, the apparatus comprising:
   a resilient sealing ring disposed on the beverage machine, the resilient sealing ring having:
      an opening for receiving a container;
      an inner surface facing the container; and
      an outer surface opposite the inner surface, the outer surface comprising a recess; and
   a bracket comprising a protrusion extending inwardly from an inner surface of the bracket, the protrusion on the inner surface of the bracket comprising a wheel configured to rotate around an axis parallel to an axis of the bracket, and the bracket surrounding the resilient sealing ring and rotatable between (i) an unlocked orientation aligning the protrusion with the recess of the resilient sealing ring, and (ii) a locked orientation aligning the protrusion with a non-recessed portion of the resilient sealing ring and compressing the resilient sealing ring between the bracket and the container.

2. The apparatus of claim 1, the outer surface of the resilient sealing ring further comprising a protrusion extending outwardly, wherein, when the bracket is in the locked orientation, the protrusion of the bracket aligns with the protrusion of the resilient sealing ring.

3. The apparatus of claim 2 wherein:
   the outer surface of the resilient sealing ring comprises a plurality of recesses and protrusions extending outwardly;
   the inner surface of the bracket comprises a plurality of protrusions extending inwardly; and
   when the bracket is in the locked orientation, the plurality of protrusions on the resilient sealing ring engages the plurality of protrusions of the bracket.

4. The apparatus of claim 2 wherein the inner surface of the resilient sealing ring comprises a plurality of protrusions for engaging the container.

5. The apparatus of claim 1 further comprising:
   a first set of teeth disposed on an outer surface of the bracket; and
   an arm movable between a first position and a second position, the arm comprising a second set of teeth for engaging the first set of teeth on the bracket, the engagement causing the bracket to rotate from the unlocked orientation to the locked orientation in response to the arm moving from the first position to the second position.

6. The apparatus of claim 5 further comprising an actuator for moving the arm between the first position and the second position.

7. The apparatus of claim 6 wherein the actuator is accessible from an exterior of the beverage machine.

8. The apparatus of claim 6 wherein an end of the actuator is pivotally attached to the beverage machine, and the arm is pivotally attached to a portion of the actuator spaced from the end of the actuator, and wherein the arm moves between the first position and the second position in response to the rotation of the actuator around the end.

9. The apparatus of claim 8 wherein rotation of the actuator around the end causes the arm to move linearly between the first position and the second position.

10. The apparatus of claim 5 further comprising:
- a second resilient sealing ring disposed on the beverage machine for receiving a second container; and
- a second bracket rotatable around the second resilient sealing ring between an unlocked orientation and a locked orientation, the second bracket comprising a third set of teeth for engaging the first set of teeth on the bracket, the engagement causing the second bracket to rotate from the unlocked orientation to the locked orientation in response to the bracket rotating from the unlocked orientation to the locked orientation.

11. The apparatus of claim 10 wherein the third set of teeth is positioned to engage an upper portion of the first set of teeth and the second set of teeth is positioned to engage a lower portion of the first set of teeth.

12. The apparatus of claim 5 further comprising:
- a second resilient sealing ring disposed on the beverage machine for receiving a second container; and
- a second bracket rotatable around the second resilient sealing ring between an unlocked orientation and a locked orientation, the second bracket comprising a third set of teeth for engaging a fourth set of teeth on the arm, the engagement causing the second bracket to rotate from the unlocked orientation to the locked orientation in response to the arm moving from the first position to the second position.

* * * * *